(12) United States Patent
Lamy et al.

(10) Patent No.: US 11,505,335 B2
(45) Date of Patent: Nov. 22, 2022

(54) DAMPER FOR AN OBJECT PLACED IN A MEDIUM SUBJECTED TO VIBRATIONS AND CORRESPONDING DAMPER SYSTEM

(71) Applicants: Centre National d'Etudes Spatiales, Paris (FR); SMAC, La Garde (FR)

(72) Inventors: Pierre Lamy, Six Fours les Plages (FR); Tony Demerville, La Crau (FR); Quentin Bianco, Le Pradet (FR); Roseline Schmisser, Toulouse (FR); Aurelien Hot, Ramonville St Agne (FR); Elisabeth Laurent, Lavalette (FR)

(73) Assignee: CENTRE NATIONAL D'ETUDES SPATIALES (CNES), Paris (FR)

( * ) Notice: Subject to any disclaimer, the term of this patent is extended or adjusted under 35 U.S.C. 154(b) by 729 days.

(21) Appl. No.: 16/454,882

(22) Filed: Jun. 27, 2019

(65) Prior Publication Data

US 2020/0002028 A1    Jan. 2, 2020

(30) Foreign Application Priority Data

Jun. 27, 2018 (FR) ...................................... 18/55815

(51) Int. Cl.
*B64G 1/22* (2006.01)
*B64G 1/10* (2006.01)

(52) U.S. Cl.
CPC .................. *B64G 1/22* (2013.01); *B64G 1/10* (2013.01); *B64G 2001/228* (2013.01); *B64G 2700/24* (2013.01)

(58) Field of Classification Search
CPC ...... B64G 1/22; B64G 1/10; B64G 2001/228; B64G 2700/24
See application file for complete search history.

(56) References Cited

U.S. PATENT DOCUMENTS

| 2012/0146311 A1* | 6/2012 | Williams | ............... B62K 21/02 267/136 |
| 2013/0299669 A1* | 11/2013 | Laurens | ................. B64G 1/641 248/573 |
| 2014/0190677 A1* | 7/2014 | Platus | ................... F25D 19/006 165/185 |

FOREIGN PATENT DOCUMENTS

WO    WO-9221912 A1 * 12/1992    .............. F16F 15/02

* cited by examiner

*Primary Examiner* — Justin M Benedik
(74) *Attorney, Agent, or Firm* — Burris Law, PLLC

(57) ABSTRACT

A damper for an object is placed in a medium subjected to vibrations. The damper has an idle state in the absence of vibrations, a first operating state in case of vibrations of a first type, and a second operating state in case of vibrations of a second type. The level of each vibration of the first type is less than the level of each vibration of the second type. The damper includes an outer support structure, an inner support structure, and at least one pair of membranes formed of a first membrane and a second membrane. Each membrane is formed of a viscoelastic material including fibers aligned substantially in a same direction.

14 Claims, 2 Drawing Sheets

DAMPER FOR AN OBJECT PLACED IN A MEDIUM SUBJECTED TO VIBRATIONS AND CORRESPONDING DAMPER SYSTEM

CROSS-REFERENCE TO RELATED APPLICATIONS

This application claims priority to and the benefit of FR 18/55815 filed on Jun. 27, 2018. The disclosure of the above application is incorporated herein by reference.

FIELD

The present disclosure relates to a damper for an object placed in a medium subjected to vibrations and a corresponding damping system.

BACKGROUND

The statements in this section merely provide background information related to the present disclosure and may not constitute prior art.

In the state of the art, in order to limit the propagation of micro-vibrations generated by equipment onboard a spacecraft, one of the solutions consists in decoupling them from the structure of the spacecraft using viscoelastic dampers. For this solution to be effective, this suspension mode must be stalled relatively low (typically of the order of 10 to 20 Hz). As it stands, this would cause very significant displacements during the launch, that are incompatible with the mechanical strength of these elements.

To overcome this problem, one of the solutions used in the state of the art is based on the use of elastic stops set in parallel to the low frequency suspension, and whose role is to maintain the levels of launches. The disadvantage of this system is the generation of shocks on the equipment and the justification of maintaining the equipment exposed to these stresses.

Another solution also used in the state of the art is based on the use of stacking systems allowing to block the suspended system at launch, but these systems are difficult to implement. They are indeed often voluminous and expensive.

Thus, none of the known attenuation systems allow combining a low rigidity (necessary for filtering micro-vibrations) with a high rigidity (necessary for supporting the dynamic launch loads) while remaining compact, simple to put in place and relatively inexpensive.

SUMMARY

In one form, a damping system according to the present disclosure is in particular intended to be installed in a spacecraft, for example a satellite, for damping vibrations of an object onboard this craft. This object is for example a payload of the spacecraft or onboard equipment.

The damping system according to the present disclosure reduces the micro-vibrations generated by equipment onboard the spacecraft while being compatible with launching vibrations (without resorting to an auxiliary device).

To this end, the present disclosure relates to a damper for an object placed in a medium subjected to vibrations. The damper has an idle state in the absence of vibrations, a first operating state in case of vibrations of a first type and a second operating state in case of vibrations of a second type, the level of each vibration of the first type being less than the level of each vibration of the second type. That is, the damper is configured to have an idle state in the absence of vibrations, a first operating state in case of vibrations of the first type and a second operating state in case of vibrations of the second type, the level of each vibration of the first type being less than the level of each vibration of the second type. Stated differently, damper is intended to have an idle state in the absence of vibrations, a first operating state in case of vibrations of the first type and a second operating state in case of vibrations of the second type, the level of each vibration of the first type being less than the level of each vibration of the second type. The damper comprises an outer support structure intended to be in rigid contact with the medium and forming a first fastening segment and a second fastening segment disposed facing one another. The damper also comprises an inner support structure intended to be in rigid contact with the object. The present disclosure comprises at least one pair of membranes formed of a first membrane extending between the inner support structure and the first fastening segment of the outer support structure in one or more direction(s) of extension, and a second membrane extending between the inner support structure and the second fastening segment of the outer support structure in one or more direction(s) of extension. Each membrane is formed of a viscoelastic material including fibers aligned substantially in a same direction.

According to other advantageous aspects of the present disclosure, the damper comprises one or more of the following characteristics, taken separately or according to all the technically possible combinations.

In the idle state, each membrane extends substantially in a single direction of extension having a curvature.

When the damper switches from the idle state to the second operating state, the curvature of the direction of extension of one of the two membranes of each pair of membranes increases relative to the curvature of the direction of extension in the idle state of this membrane and the curvature of the direction of extension of the other membrane of the same pair of membranes decreases relative to the curvature of the direction of extension in the idle state of this membrane.

In the first operating state, each membrane extends substantially in several intersecting directions.

The vibrations of the second type correspond to vibrations whose acceleration levels are greater than 0.1 g, for example greater than 0.3 g, where g is the gravity acceleration (i.e., acceleration due to gravity) at the surface of the earth.

The damper includes at least two pairs of membranes such that the first membranes of these pairs and the second membranes of these pairs are disposed facing one another.

Each membrane is made of a viscoelastic material with an aligned fiber structure.

The medium subjected to vibrations is a spacecraft, in particular a spacecraft intended to be launched from the surface of the earth.

The present disclosure also relates to a damping system comprising several dampers as defined above, intended to damp vibrations of the object.

According to other advantageous aspects of the present disclosure, the damping system comprises one or more of the following characteristics, taken separately or according to all the technically possible combinations, The dampers are intended to be disposed in a peripheral portion of the object such that the inner support structure of each damper is in contact with this peripheral portion of the object.

At least some of the membranes of at least some of the dampers define at least one slot extending between fastening ends of the membrane corresponding to the inner support structure and to the outer support structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
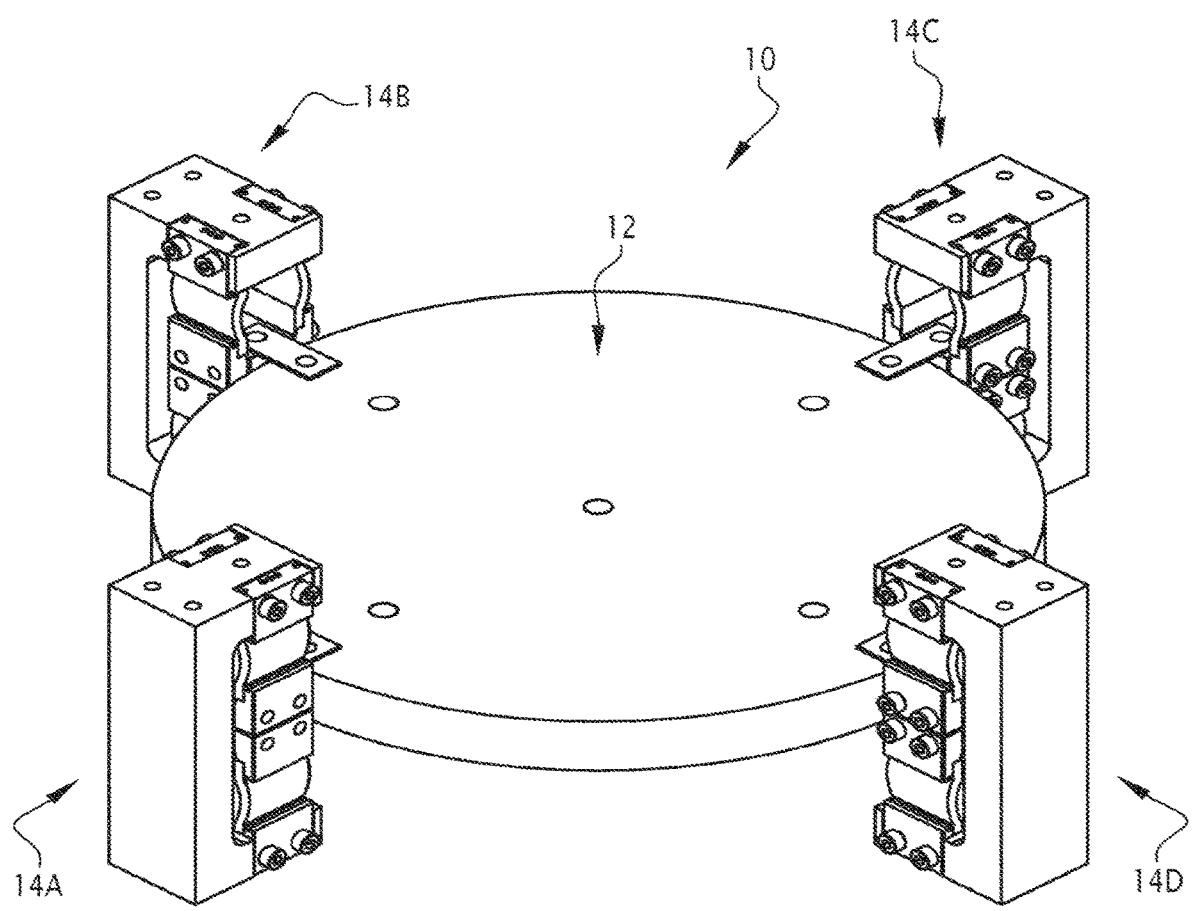
FIG. 1 is a perspective view of a damping system including several dampers according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In a described example, a damping system 10 shown in FIG. 1 is onboard a spacecraft, in particular a satellite intended to be launched from the surface of the earth.

As is known per se, the satellite includes onboard equipment having for example a payload of this satellite. The satellite further includes at least one fastening structure intended to fasten the onboard equipment.

The damping system 10 allows damping vibrations of an object 12 onboard the satellite and having for example one piece of onboard equipment.

In FIG. 1, the object 12 is represented by a rigid disc having a peripheral portion and being able to serve for example as a platform for another onboard equipment. This onboard equipment is intended to be rigidly fastened on the object 12.

According to one form of the present disclosure, the object 12 in turn has onboard equipment to be damped.

Of course, the damping system 10 can be onboard any other mobile craft or more generally, serve in any other medium having significant vibrations as well as micro-vibrations.

In the following description, significant vibrations or vibrations of the second type refer high level vibrations whose acceleration levels range from a few tenths to a few tens of g.

Micro-vibrations or vibrations of the first type refer to vibrations of low levels, that is to say levels less than those of the vibrations of the second type.

Particularly, it is known, for example, that during the launching of a satellite, its onboard equipment undergo significant vibrations whose levels may vary from a few tenths to a few tens of g, and when the satellite is in orbit, its onboard equipment undergo micro-vibrations whose levels are less these values.

To damp the vibrations of the object 12, the damping system 10 includes several dampers according to the present disclosure. These dampers are for example disposed at the peripheral portion of the object 12 and include a portion having a rigid connection therewith, as will be explained later.

Four dampers 14A to 14D are illustrated in FIG. 1.

Each of these dampers 14A to 14D has an idle state in the absence of vibrations, a first operating state in case of vibrations of the first type and a second operating state in case of vibrations of the second type.

Figure 2:
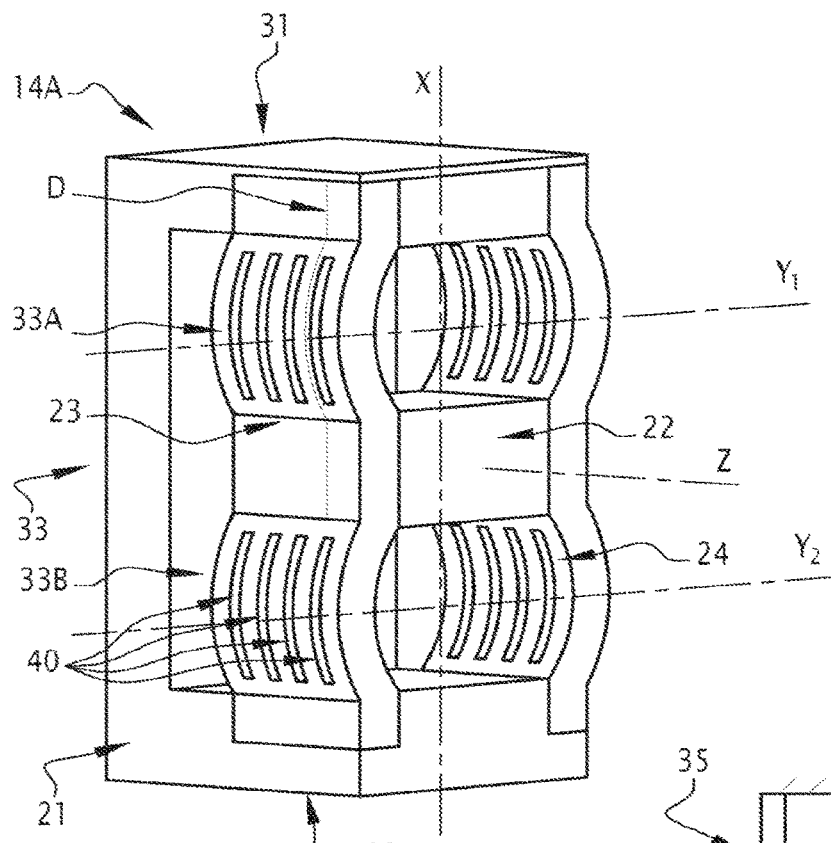
FIG. 2 is a perspective view of one of the dampers of FIG. 1.
Figure 3:
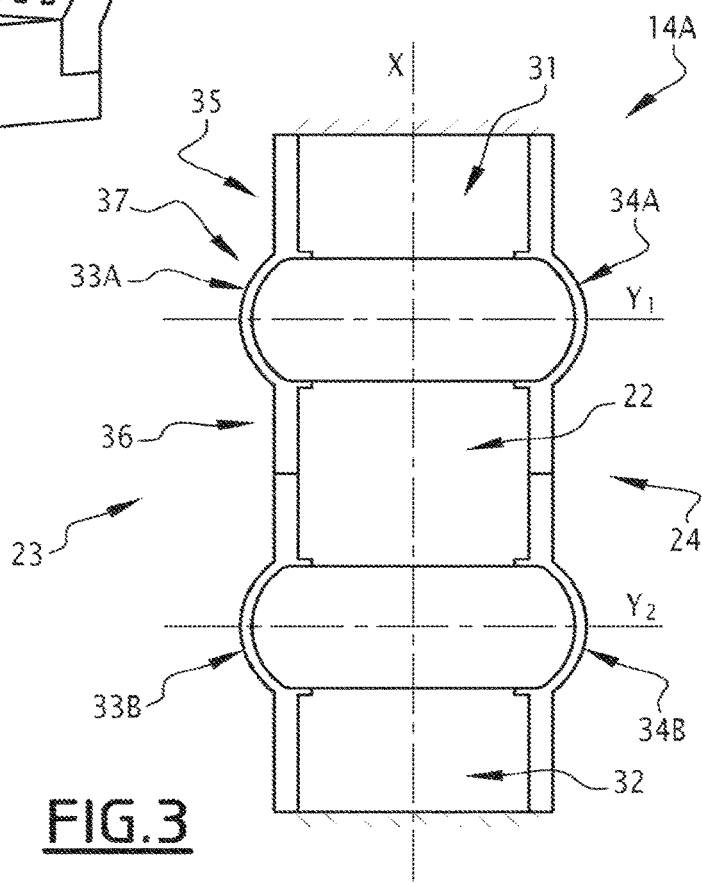
FIG. 3 is a front view of the damper of FIG. 2.

The dampers 14A to 14D are, for example, substantially identical. Thus, subsequently, only the damper 14A will be explained in detail with reference in particular to FIGS. 2 and 3 illustrating respectively its perspective view and its front view in the idle state.

As visible in these figures, the damper 14 comprises an outer support structure 21, an inner support structure 22 and two pairs of membranes 23, 24 extending between the outer 21 and inner 22 structures.

The outer support structure 21 is intended to be in rigid contact with the fastening structure of the satellite and includes for example, to this end, suitable fasteners.

The outer support structure 21 forms a first fastening segment 31 and a second fastening segment 32 disposed facing one another along a support axis X.

In the form of the present disclosure shown in FIG. 1, the fastening segments 31, 32 are connected to one another by a junction portion 33 which forms, for example, a single part with these fastening segments 31, 32. In this case, the outer support structure 21 is in the form of «U» whose ends correspond to the fastening segments 31, 32.

According to another form of the present disclosure, the fastening segments 31, 32 form separate parts intended for example to be separately fastened on one or more fastening structure(s) of the satellite.

The inner support structure 22 is intended to be in rigid contact with the object 12 and according to one variation of the present disclosure, includes to this end suitable fasteners.

According to another variation, the inner support structure 22 is secured to the object 12.

The inner support structure 22 is connected to the outer support structure 21 via the pairs of membranes 23, 24.

Particularly, each pair of membranes 23, 24 is formed of a first membrane 33A, 34A extending between the inner support structure 22 and the first fastening segment 31 of the outer support structure 21, and a second membrane 33B, 34B extending between the inner support structure 22 and the second fastening segment 32 of the outer support structure 21.

The first membranes 33A, 34A of the pairs 23, 24 are disposed facing one another along a transverse axis $Y_1$ perpendicular to the support axis X and to an axis Z. Similarly, the second membranes 33B, 34B of the pairs 23, 24 are disposed facing one another along a transverse axis $Y_2$ perpendicular to the support axis X and to the axis Z. The transverse axis $Y_2$ is therefore parallel to the transverse axis $Y_1$.

The membranes 33A, 34A, 33B, 34B are, for example, substantially identical.

Particularly, each membrane 33A, 34A, 33B, 34B is in the form of a flexible plate having two fastening ends and a flexible portion extending between the fastening ends. In FIG. 3, the fastening ends 35, 36 and the flexible portion 37 only of the membrane 33A are referenced.

In the idle state, each membrane 33A, 34A, 33B, 34B extends substantially in a single direction of extension having a domed two-dimensional curve.

The direction of extension D of the membrane 33A is visible in FIG. 2.

In the second operating state of the damper 14A, each membrane 33A, 34A, 33B, 34B also extends substantially in a single direction of extension having a curvature different from that of the idle state.

When the damper 14A switches from the idle state to the second operating state, one of the membranes of a same pair of membranes rounds off (i.e., becomes more domed or curved) and the other flattens until it becomes completely flat, which allows damping the vibrations of the second type along the support axis X, the transverse axes $Y_1$ and $Y_2$, and the axis Z.

In the first operating state, each membrane 33A, 34A, 33B, 34B extends substantially in several intersecting directions of extension. In other words, in the first operating state, each membrane 33A, 34A, 33B, 34B is bent, which allows damping the vibrations of the first type along the support axis X, the transverse axes $Y_1$ and $Y_2$, and the axis Z.

Each membrane 33A, 34A, 33B, 34B is formed of a viscoelastic material including fibers aligned substantially in a same direction coinciding for example with the direction of extension of this membrane in the idle state. These fibers are for example Kevlar® fibers.

According to one advantageous aspect of the present disclosure, at least some of the membranes 33A, 34A, 33B, 34B define at least one slot extending between the fastening ends of this membrane. Particularly, when the damper 14A is in the idle state, the or each slot of the corresponding membranes extends substantially in the direction of extension of the corresponding membrane.

Four slots defined in each of the membranes 33A, 34A, 33B, 34B are visible in FIG. 2. The slots formed in the membrane 33B are referenced in this figure by the reference «40».

The slots formed in the membranes allow reducing the stiffness of the dampers in particular along the transverse axes $Y_1$ and $Y_2$ and along the axis Z promoting sliding between the different sections thus created, without impacting stiffnesses along the support axis X. This then allows balancing the stiffnesses in the three directions and avoiding an asymmetry in the system 10.

Finally, each membrane 33A, 34A, 33B, 34B is, for example, made by simple compression molding of a viscoelastic material with an aligned fiber structure. Then, the slots are formed on at least some of the membranes 33A, 34A, 33B, 34B with a suitable template.

The operation of the damping system 10 will now be explained.

Initially, in the absence of vibrations of the object 12, each of the dampers 14A to 14D is in the idle state.

When significant vibrations, that is to say vibrations of the second type, occur (for example when launching the satellite), the fibers of each membrane start to work in tension such that some membranes round off and the others flatten. This then rigidifies the structure along the support axis X, the transverse axes $Y_1$ and $Y_2$, and the axis Z.

When micro-vibrations, that is to say vibrations of the first type, occur (for example when the satellite is placed on the orbit), the fibers of each membrane work in bending. This then makes the structure sufficiently flexible to filter these micro-vibrations along the support axis X, the transverse axes $Y_1$ and $Y_2$, and the axis Z.

Moreover, the slots formed in the membranes allow balancing the distribution of stiffnesses along the different axes.

It is then understood that the damping system according to the present disclosure is particularly simple and compact. It allows damping micro-vibrations while resisting vibratory environments of significant levels, in all three dimensions. Therefore, this makes it particularly attractive for the spatial domain.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

The invention claimed is:

1. A damper for an object placed in a medium subjected to vibrations, the damper having an idle state in an absence of vibrations, a first operating state in case of vibrations of a first type, and a second operating state in case of vibrations of a second type, a level of each vibration of the first type being less than a level of each vibration of the second type; the damper comprising:
   an outer support structure configured to be in rigid contact with the medium and forming a first fastening segment and a second fastening segment disposed facing one another;
   an inner support structure configured to be in rigid contact with the object;
   a pair of membranes formed of a first membrane extending between the inner support structure and the first fastening segment of the outer support structure in one or more directions of extension, and a second membrane extending between the inner support structure and the second fastening segment of the outer support structure in the one or more directions of extension, wherein each membrane of the pair of membranes is formed of a viscoelastic material including fibers, wherein the fibers work in bending when vibrations of the first type occur and work in tension when vibrations of the second type occur.

2. The damper according to claim 1, wherein, in the idle state, each membrane of the pair of membranes extends substantially in a single direction of extension having a curvature.

3. The damper according to claim 2, wherein, when the damper switches from the idle state to the second operating state, the curvature of the single direction of extension of one membrane from the pair increases relative to the curvature of the direction of extension in the idle state of the one membrane, and the curvature of the direction of extension of the other membrane from the pair of membranes decreases relative to the curvature of the direction of extension in the idle state of the other membrane.

4. The damper according to claim 1, wherein, in the first operating state, each membrane of the pair of membranes substantially in several intersecting directions.

5. The damper according to claim 1, wherein the vibrations of the second type correspond to vibrations whose acceleration levels are greater than 0.1 g, wherein g is the gravity acceleration at the surface of the earth.

6. The damper according to claim 1 further comprising at least two pairs of membranes such that a first membrane from a given pair of membranes and a second membrane from the given pair of membranes are disposed facing one another.

7. The damper according to claim 1, wherein each membrane made of a viscoelastic material with an aligned fiber structure.

8. The damper according to claim 1, wherein the medium subjected to vibrations is a spacecraft configured to be launched from a surface of earth.

9. A damping system comprising a plurality of the dampers according to claim 1, wherein the plurality of the dampers are configured to dampen vibrations of the object.

10. The system according to claim 9, wherein the dampers are intended to be disposed in a peripheral portion of the object such that the inner support structure of each of the plurality of the dampers is in contact with the peripheral portion of the object.

11. The system according to claim 9, wherein at least some of the membranes of at least some of the dampers from among the plurality of the dampers define at least one slot extending between fastening ends of the membrane corresponding to the inner support structure and to the outer support structure.

12. The damper according to claim 1, wherein the vibrations of the second type correspond to vibrations whose acceleration levels are greater than 0.3 g, wherein g is the gravity acceleration at the surface of the earth.

13. The damper according to claim 1, wherein the fibers are aligned substantially in a same direction.

14. The damper according to claim 1, wherein at least one slot is defined in each of the first and second membranes.

* * * * *